United States Patent
Gendron et al.

(10) Patent No.: US 6,484,247 B1
(45) Date of Patent: Nov. 19, 2002

(54) SYSTEM AND METHOD FOR STORING AND RETRIEVING OBJECTS

(75) Inventors: Robert F. Gendron, Salem, MA (US); Stephen K. Jones, Canton, MA (US)

(73) Assignee: Intellution, Inc., Foxborough, MA (US)

( * ) Notice: Subject to any disclaimer, the term of this patent is extended or adjusted under 35 U.S.C. 154(b) by 0 days.

(21) Appl. No.: 09/340,337

(22) Filed: Jun. 25, 1999

Related U.S. Application Data

(60) Provisional application No. 60/090,655, filed on Jun. 25, 1998.

(51) Int. Cl.[7] .............................................. G06F 12/00
(52) U.S. Cl. ...................... 711/170; 711/124; 711/206
(58) Field of Search ................................. 711/124, 170, 711/206; 707/103, 103 R, 206; 709/332, 203; 501/151

(56) References Cited

U.S. PATENT DOCUMENTS

| | | | |
|---|---|---|---|
| 5,297,279 A | * 3/1994 | Bannon et al. ......... | 707/103 R |
| 5,426,747 A | 6/1995 | Weinreb et al. | |
| 5,649,139 A | 7/1997 | Weinreb et al. | |
| 5,864,862 A | * 1/1999 | Kriens et al. ................ | 707/103 |
| 5,872,973 A | * 2/1999 | Mitchell et al. ............ | 709/332 |
| 5,903,725 A | * 5/1999 | Colyer ........................ | 709/203 |
| 5,920,876 A | * 7/1999 | Ungar et al. ................ | 707/206 |
| 6,071,317 A | * 6/2000 | Nagel ............................ | 717/4 |
| 6,112,207 A | * 8/2000 | Nori et al. ................... | 501/151 |
| 6,112,210 A | * 8/2000 | Nori et al. .............. | 707/103 R |
| 6,199,141 B1 | 3/2001 | Weinreb et al. | |
| 6,275,828 B1 | 8/2001 | Lee et al. | |

* cited by examiner

Primary Examiner—David Hudspeth
Assistant Examiner—Fred F. Tzeng
(74) Attorney, Agent, or Firm—Wolf, Greenfield & Sacks, P.C.

(57) ABSTRACT

A system and method for storage and retrieval of objects. The objects are stored on a permanent medium in a manner to allow for fast recovery of the objects from the medium. The objects are stored in a format that is structurally equivalent to the format of the objects on a volatile medium, such as memory of a general-purpose computer. Objects are stored according to a data relationship with other objects. The objects may be stored as a stream of objects and offset references. Offset references are converted to actual memory addresses as objects are retrieved into the volatile medium.

45 Claims, 12 Drawing Sheets

SYSTEM AND METHOD FOR STORING AND RETRIEVING OBJECTS

RELATED APPLICATIONS

This application claims the benefit under Title 35, U.S.C. §119(e) of co-pending U.S. Provisional Application Ser. No. 60/090,655, filed Jun. 25, 1998, entitled "COMPUTER SYSTEM AND PROCESS FOR STORAGE AND RETRIEVAL OF OBJECTS" by Robert F. Gendron and Stephen K. Jones, the contents of which are incorporated herein by reference.

BACKGROUND OF THE INVENTION

1. Field of the Invention

The present invention relates generally to object-oriented software systems, and more particularly, to the storage and retrieval of objects.

2. Related Art

Object-oriented programming methods are the primary programming methods used by the computer software industry. Object-oriented programming methods allow programmers to create complex systems by reusing common mechanisms. Specifically, object-oriented programming is a method of implementation in which programs are organized as cooperative collections of objects, each of which represents an instance of an object model, and whose models are members of a hierarchy of models united via inheritance relationships. Object-oriented systems are designed according to these object models, commonly referred to as classes. Objects are created, or instantiated, by creating in memory an instance of a class. Object models encompass principles of abstraction, encapsulation, modularity, hierarchy, typing, concurrency and persistence. Examples of object-oriented programming languages include C++, Java, Smalltalk, Eiffel, Ada, and CLOS, among others. Objects and object-oriented programming concepts are well-known and are described in more detail in the reference entitled *Object-Oriented Analysis and Design With Applications*, Second Edition by Grady Booch, Benjamin/Cummings Publishing Company, 1994, incorporated herein by reference.

An object has both state and behavior. That is, an object stores data, interacts with other objects, and many include one or more methods associated with that object. An object method typically performs some function with respect to data. Primitive data for an object includes simple storage types such as integer or character data types. A simple object comprises simple storage types. A general compound object is a combination of simple objects, simple storage types and other compound objects. A fundamental concept of object-oriented programming is to define a construction mechanism that allows a compound object to be built from simpler objects. A compound object has all of the operational characteristics of the simpler existing object class plus any modifications to behavior or data.

An object generally has a size which defines an area of storage locations that an object could use to store information related to the object. The size of the object is typically known by a compiler for the programming language. The size of the object is the aggregation of immediate data, references to data, and access to a function table defined for the class. Immediate data is data that is defined within the structure of the object. References are generally pointers to data. The size of immediate data is known by the compiler while references are typically pointers to data located elsewhere. Generally, a pointer is an identifier that indicates a location of an item of data.

Referenced data may be fixed or variable size. For an object with a reference to data it is usually not always the object responsibility to know whether the data that is referenced is fixed or variable in size. The referenced data contained by an object may be a reference to a block of data of fixed sized, a block of data of variable size or a reference to some other object or an instance of some other object. Typically, a general storage mechanism accounts for storage elements including immediate data, referenced data and object references and object instances.

An object may be derived from another object. The instance data of a derived object has as a subset instance data of the base object and also a function table of the base object. This relationship is defined as "inheritance." From the derived object's point of view the instance data of the base object appears to be immediate data. The size of the base instance data is known apriori. The base object is cognizant of whether the base instance data is purely immediate data (no references) or whether there is a mix of references and or immediate data. The derived object has no direct access to the base instance data. The derived object may access the base instance data by the base function table.

A derived object may override the functionality of a base object function. In this situation, the derived function is called if a request is made directly on the derived object. A "virtual" function is a special case of derivation. A class definition declares that a function is to be virtual. By so doing, the class includes a function that may be overriden by the derived class. If a base object reference is called with a function that is overriden by a derived class object instance, the derived function is called and the base object assumes the personna of the derived class. If the function is not virtual, the base function calls the function from the base class function table whether the derived object class provides an override function or not. A virtual function table is maintained by the computer system in memory as a result of code generated by the C++ compiler at compile time. An object that includes methods that are virtual has a compiler-generated table that is not visible to the user. The virtual function table is evolved as a derived object is constructed and devolved as a derived object is destructed.

When an object is realized in memory, it is said to be instantiated. Instantiation of objects is performed by functions known as constructors. Constructors operate on volatile memory and define the way to initialize an object of its class. The content of an object has two major components: (1) data comprising the instance data of the class and (2) an object function table that defines methods of the class. The data comprising the object is generally in one of two forms: (1) immediate data and (2) a reference to data located elsewhere. An object class may have one or more constructors that defines how an instance of the object is to be built in volatile memory.

Each constructor has a unique parameter passing argument list which defines how the object is to be constructed. The user calls the constructor with an argument set that matches one of the defined sets of arguments to initialize an object with the desired constructor. Defining functions such as constructors, with the same name that operate on different types is called overloading, and is well-known in C++. The constructor usually allocates memory for the object according to the size of the object and initializes all data that forms the immediate data area of the object. Each object class has a special function table entry for a function, referred to as a destructor, that is called when the object is destroyed. The destructor is utilized to release all system assets that the object utilizes. One of the main purposes of the destructor is to release memory that was allocated by the object on its behalf during some phase of computation.

A derived object is created by calling a constructor in a manner analogous to the original base class. The derived object calls a base class constructor by invoking a base constructor with a matching set of arguments from a base class constructor set. The base class is intialized before any instance data of the derived object is initialized or before the code in the constructor written by a user is called.

Object-orientation programming languages allow data to be abstract, that is, defined by the user. Further, object-oriented languages allow objects to inherit properties from other objects. In particular, inheritance permits a programmer to create objects that inherit data and methods from other objects. Objects in an inheritance relationship are said to have a hierarchical relationship. Generally, software systems include many objects in an object hierarchy.

Objects may include a number of different data types. Examples of these types are integer (int) and character (char). Some data types such as integer and character are built-into a programming language such as C++. There are also types referred to as abstract data types that are user-defined, such as those complex data types defined by class definitions in an object-oriented programming language. Data types and the C++ language are described in more detail in the reference entitled C++ *Programming Language*, Third Edition by Bjarne Stroustrup, Addison-Wesley, 1997, incorporated herein by reference.

Objects are said to be either dynamically or statically bound to a data type. Both static and dynamic terms refer to the times when names of objects are bound to types. Static binding means that the types of all variables and expressions are fixed at the time of compilation; dynamic binding means that the types of all variables are not known until runtime.

An object takes up some amount of space in memory and exists for a particular amount of time. Persistence in an object-oriented system allows a programmer to save state and class of an object across time and space. More specifically, persistence is defined as the property of an object through which its existence transcends time (i.e. the object continues to exist after its creator, such as a software program, ceases to exist) and/or space (i.e. the object's location moves from the address space in which it was created).

Programming languages such as C++ and object-oriented databases provide an ability to store and retrieve runtime objects from memory. Generally, objects are persisted from volatile to non-volatile types of memory. Volatile memory or storage is storage that loses its data when power is removed from the system. An example of volatile memory device is a RAM device of a general purpose computer. In contrast, non-volatile memory or storage holds information when power is removed from a system. Examples of non-volatile memory include magnetic media such as hard disks or diskettes or optical media such as optical disks. Generally, media is defined as the means by which data is transmitted or stored. Other types of volatile and non-volatile media are available.

In C++, there are three fundamental ways of using volatile memory. In static memory, an object is allocated a pre-defined amount of memory for the duration of the software program. Automatic memory is an area in which function arguments and local variables are allocated. Automatic memory is automatically created and destroyed and is referred in the art to as "the stack." Free store is a type of memory which is explicitly requested by the program and where a program can the free store memory once the program is done with it (such as through using C++ new and delete operators). Free store (also referred to as "the heap") grows throughout the lifetime of the program because no free store memory is returned to the operating system. Objects may be instantiated on the stack or heap, depending on the implementation.

One such programming language that provides persistence functions is the Visual C++ language available from the Microsoft Corporation. The Visual C++ language includes an archive function which allows a programmer to create persistent objects. Also, Microsoft provides what is known in the art as the Microsoft Foundation Class (MFC) programming library which is used by object-oriented programmers to create software programs. These and other objects may be persisted to non-volatile media by using the conventional archive function.

Basic steps involved in conventional recovery of objects from non-volatile media include (1) allocating memory for an object, (2) accessing non-volatile media (such as a file on disk storage), (3) copying data from non-volatile media to internal memory buffers of a volatile image of the file, and (4) copying elements of data from the volatile memory image of the file to the internal contents of the object. This process is performed for each individual object, and may take long periods of time for systems with large numbers of objects.

SUMMARY OF THE INVENTION

In one aspect of the invention, a method is provided which eliminates steps of conventional archival of objects, thereby saving time in their recovery. Improved response time during recovery provides a competitive advantage for software systems that use large numbers of objects, such as computer-aided design systems and systems having complex graphical user interfaces, among others. In some complex software systems, thousands of objects are not uncommon.

According to various aspects, the number of memory allocations is reduced and the number of data transfers from non-volatile medium to the internals of the object is reduced. Also, additional processing of immediate data of objects is not required. Also, the need to recover each of the individual elements defined by the simple storage types is eliminated. As a result, individual allocation steps for each individual objects are eliminated; a single allocation operation is performed which bypasses the need to make the individual allocation requests to memory allocators. In another aspect, a system and method is provided that conforms with standard operations generated by commercially-available compilers.

In one aspect, a storage and retrieval system and method is provided that stores a collection of objects on a permanent medium in such a way as to allow for fast recovery of the object contents from the medium. A major objective is high performance in reconstitution of the objects. The objects that exist in a volatile memory state are stored on a non-volatile medium so that the objects may be recovered later in volatile memory. The objects that are reconstituted from the non-volatile medium have equivalent computational behavior as an original collection that resides in volatile memory. Alternatively, objects may be persisted to volatile memory as well. That is, the objects may be stored on volatile memory in the same format as the non-volatile memory format and moved electronically to some other location for reconstitution elsewhere without ever being persisted to non-volatile memory.

In another aspect, a data structure is provided that includes a plurality of objects. The plurality of objects may be serialized as a stream. The data structure may be used to represent a document composed of objects. Alternatively, the objects may be transmitted over a communications network.

In another aspect, a computer program product is provided that comprises a computer readable medium having computer program logic recorded thereon for enabling a processor in a computer system to store objects, the computer program being adapted to cause the computer to perform steps of a) storing, in a data stream, data of a first object having a reference to a second object; b) storing, in the data stream, a reference to the location second object in the data stream; and c) storing, in the data stream, data of the second object.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

DETAILED DESCRIPTION

Figure 1:
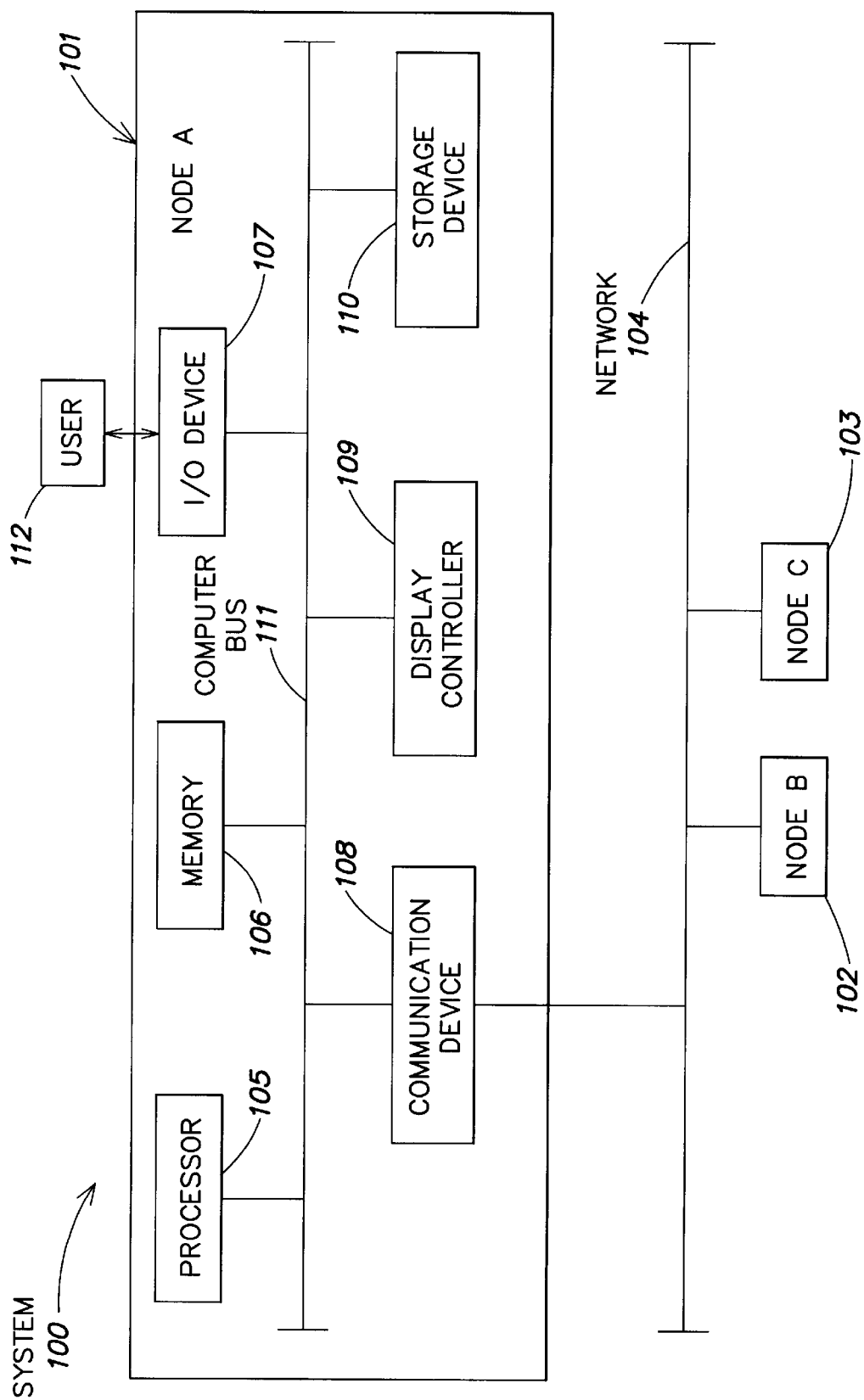
FIG. 1 is an exemplary network system wherein one embodiment of the present invention may be implemented.

An exemplary network system wherein the object storage and retrieval system of the present invention may be implemented is illustrated in FIG. 1. The exemplary network system 100 includes a plurality of nodes 101–103 interconnected through network 104. Network 104 may be, for example, a local area network (LAN), metropolitan area network (MAN), wide area network (WAN), etc., or other network used to communicate information between systems. Network 104 may also include one or more nodes that may operate as client or servers. Typically, client and servers are computers but may be any type of device that includes a network interface and may benefit from or provide resources to another system. Network 104 may contain any combination of client and server systems. Alternatively, nodes 101–103 may be standalone systems. Also, these clients and server systems may be capable of storing and retrieving objects.

An exemplary computer system implementing the object storage and retrieval system of the present invention is shown in FIG. 1 node A (item 101). Computer system 101 may be a general purpose computer system, which typically includes a processor 105 connected to a memory system 106 via an interconnection mechanism such as a computer bus 111. Input/output (I/O) devices 107 such as disk controllers, graphics cards (e.g. display controller 109), or the like may be included in computer system 101. The computer is capable of executing an operating system and is generally programmable by using a high level computer programming language such as the C++ programming language.

Node 101 includes a number of objects stored in volatile storage, such as memory system 106. Objects may be stored locally to a node A in non-volatile storage, such as in storage device 110. Alternatively, objects may be stored in one or more of the nodes in network 104, such as nodes B and C (items 102 and 103 of FIG. 1). As will be described in more detail below, the system may be capable of storing and/or retrieving objects to media located locally as well as to other nodes in network 104.

The general purpose computer system 101 preferably includes a commercially available processor 105, such as the Pentium, Pentium II or Pentium III microprocessor from Intel Corporation, PowerPC microprocessor, SPARC processor, PA-RISC processor or 68000 Series microprocessor from Motorola. Many other processors are also available. Such a processor generally includes an operating system which may be, for example, DOS, Windows 95, Windows 98, Windows NT, or Windows 2000 operating systems from the Microsoft Corporation, the System 7.X operating systems from Apple Computer, the Solaris operating system from Sun Microsystems, the Unix operating system and its variants available from many vendors including Sun Microsystems, Inc., Hewlett Packard, Red Hat Computing and AT&T, or the NetWare or IntraNetWare operating systems available from Novell, Inc.

The operating system controls the execution of other computer programs and provides scheduling, debugging, input/output control, accounting, computation, storage assignment, data management, memory management, communication control and related services. Processor 105 and an operating system defined a computer platform for which application programs and high-level programming languages are written. Systems 101–103 may be any type of computer system as described above, with a network interface card (NIC) or other communication device 108 to communicate over network 104.

The operating system interfaces with firmware and hardware of system 101 in a well-known manner to access I/O devices 107 and memory system 106. Memory system 106 may be any commonly available memory such as random access memory (RAM) or read-only memory (ROM). A storage device 110 is provided that is typically used to store data. Storage device may be, for instance, a hard drive, CDROM, tape system, or the like used to store and/or retrieve data. Other device types may be used for memory system 106 and storage device 110.

The storage and retrieval system according to various embodiments of the present invention is preferably implemented in C++, however, it may be implemented in any other well-known software language. For example, the system 201 discussed below may be implemented and interpreted in an object-orientated programming language, such as Java, ActiveX, or Smalltalk. System 201 may also be configured to execute within a browser application, such as the Netscape Navigator browser available from Netscape, Inc. or the Microsoft Internet Explorer browser available from Microsoft. Furthermore, system 201 is capable of residing on any well-known computing platform.

Software techniques for performing storage and retrieval functions in accordance with the present invention typically reside in memory 106 and may be stored on a computer-readable medium such as, for example, magnetic disk, compact disk, magnetic tape, or optical media. A software embodiment of the present invention may be, for example, loaded into computer system 101 using an appropriate peripheral device as known in the art. Alternatively, software implementing another embodiment of the present invention may be stored, for example, on a node located in network 104, and installed or executed over network 104.

It should be understood, however, that the present invention is not limited to a particular computer platform, particular operating system, or particular processor. The exemplary environments identified above are given by way of example only; the invention may be implemented in a variety of computer systems having a variety of system architectures.

Figure 2:
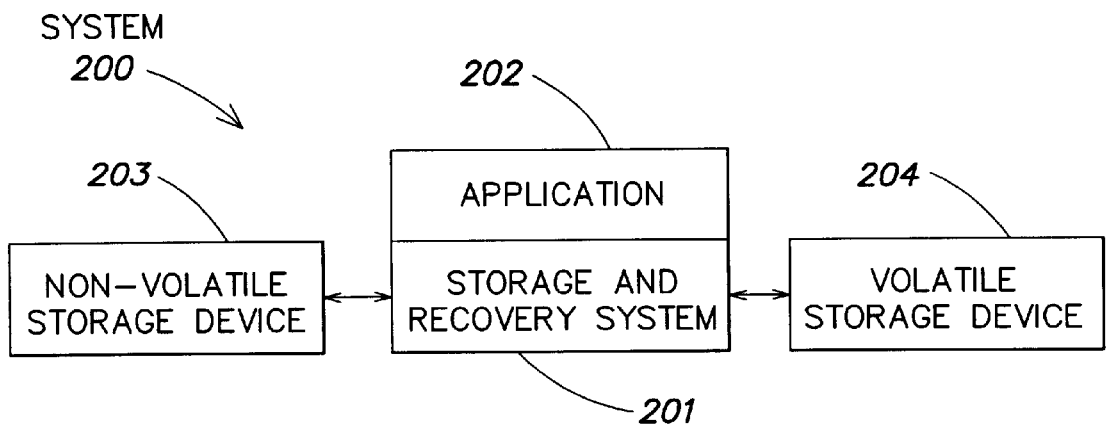
FIG. 2 is a block diagram showing a system for object storage and retrieval.

According to one embodiment of the invention, a system 200 is provided for storing and retrieving objects. Referring to FIG. 2, storage and retrieval system 201 stores and retrieves objects from application 202 that may be resident in volatile storage device 204. This storage and retrieval system may operate on one or more nodes 101–103 to store and retrieve objects. These objects are stored and retrieved to a non-volatile storage device 203. The objects are stored in a format that is structurally equivalent to the format of the objects in the volatile medium. Objects may be saved and restored to volatile storage device 204 in a quicker manner than conventional object archival solutions because less processing is required to restore the objects to volatile memory.

According to one embodiment, the objects are stored relative to their data relationship, that is, the objects are stored in the order by which they refer to data. For example, if object A inherits data from object B, object B's data would be stored first, followed by a reference to object A's data. Other relationships could be used.

In one aspect, the objects are stored as a stream of data. In one embodiment, the storage stream is a concatenation of the stored objects. The size of the stream is the total of the sizes of the included objects. Each object has a position offset in the stream where the object is located. Given an offset of an object, the object can be located within the stream.

In volatile memory, the objects contain simple data and references to other objects. When the objects are stored to a non-volatile medium, the reference to another object is stored as an offset to the other object in the stream. The offset may be, for example, a reference indicating a location of an object within the stream. When the object is recovered to volatile memory, the reference for each of the objects in the stream is reconstituted from the offset. Because the same simple data is stored to non-volatile memory in a format that is the same as in volatile memory, no processing is required on the simple data. Only object references of the individual objects need to be resolved.

Figure 3:
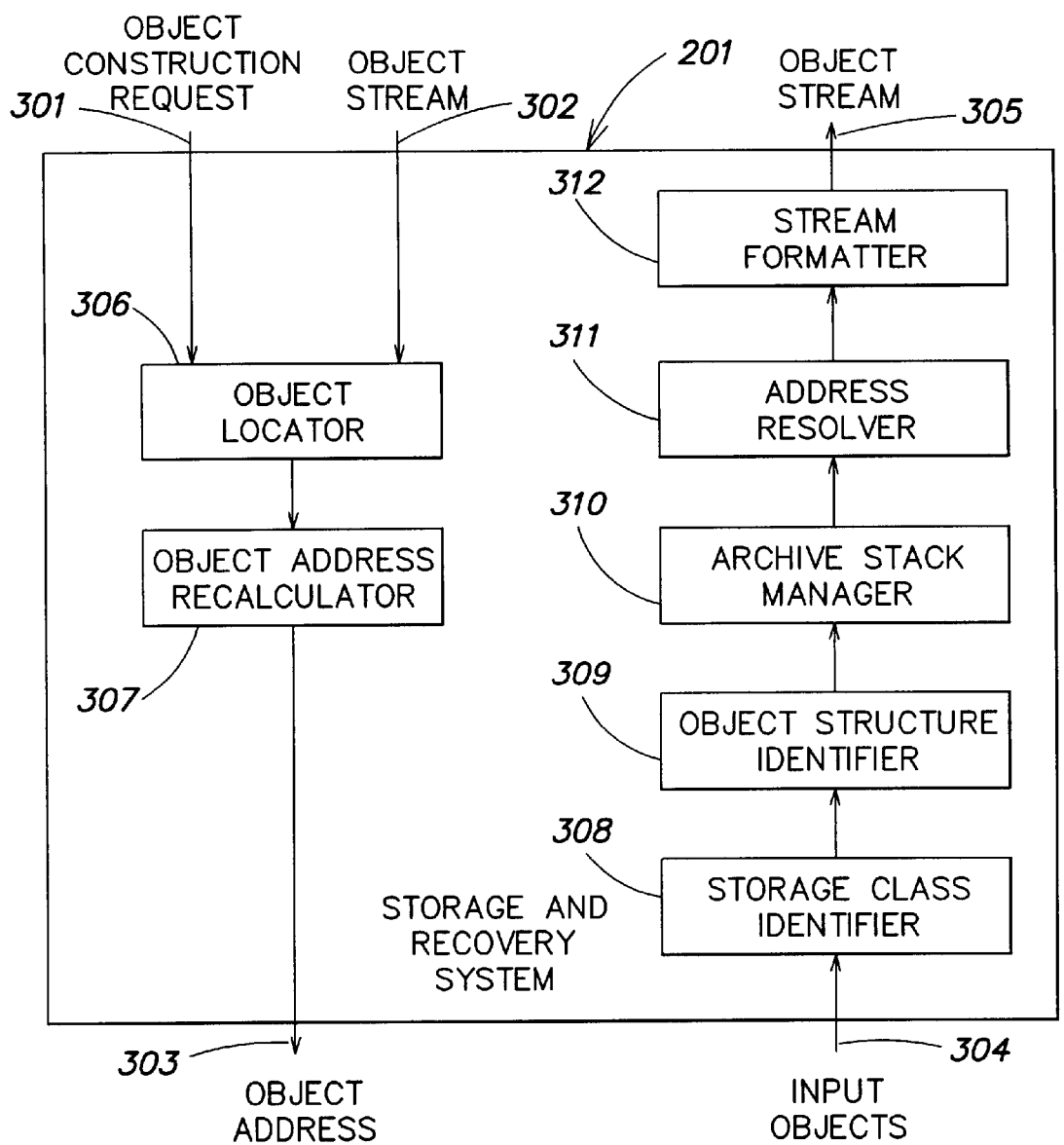
FIG. 3 is a block diagram showing a more detailed embodiment of such a system.

FIG. 3 shows a block diagram of one embodiment of a storage and recovery system 201. System 201 accepts input objects from, for example, a software application 202 and produces an object stream 305. As discussed above, object stream 305 may be saved to nonvolatile memory and the input objects 304 may be obtained from volatile memory. Further, system 201 may receive an object stream 302 and an object construction request 301 to restore one or more objects from the object stream 302 to volatile memory. The one or more objects are restored to memory, and system 201 returns an object address 303 of the object for use by an application.

More specifically, system 201 includes a storage class identifier 308 which describes object classes on the archive and generates a description of them. An object structure identifier 309 determines the structure of the object hierarchy and whether the object that is archived is the base object. As discussed an object can refer to other objects, and these referred objects are stored to non-volatile media along with the object. System 201 includes an archive stack manager 310 which maintains a description for each stored memory fragment that is saved in the archive. Each fragment includes references to data storage elements that are primitive, reference to simple objects and reference to compound objects. Address resolver 311 calculates locations of individual items in the stream and converts references from the original volatile memory addresses to stream offset addresses. Stream formatter 312 concatenates fragments of memory into one or more serial blocks which may be then output to a storage file or transmitted on a network.

The archive stack manager 310 accepts input from the objects to determine a phase of storage (start and end) and object pointers that are to be serialized into the stream. Archive stack manager 310 builds a reference model of the objects which is then used to resolve the addresses of all of the included objects. Address resolver 311 scans the stream and determines the addresses of the objects in the destination object stream 305 and modifies internal locations for cross-references between the objects. Stream formatter 312 concatenates output data to the final object stream 305 resident in non-volatile memory.

An object construction request 301 is provided by an application that requests an object of a given class. Object locator 306 locates the requested object in the stream 302 and the objects address is recalculated by object address recalculator 307. In one embodiment, the object address is recalculated from a start address of the stream and the object offset location. The object address may be determined, for example, by adding the offset address to a starting address of the stream in volatile memory. An object address 303 is produced and returned to the calling entity, such as a software application.

Figure 4:
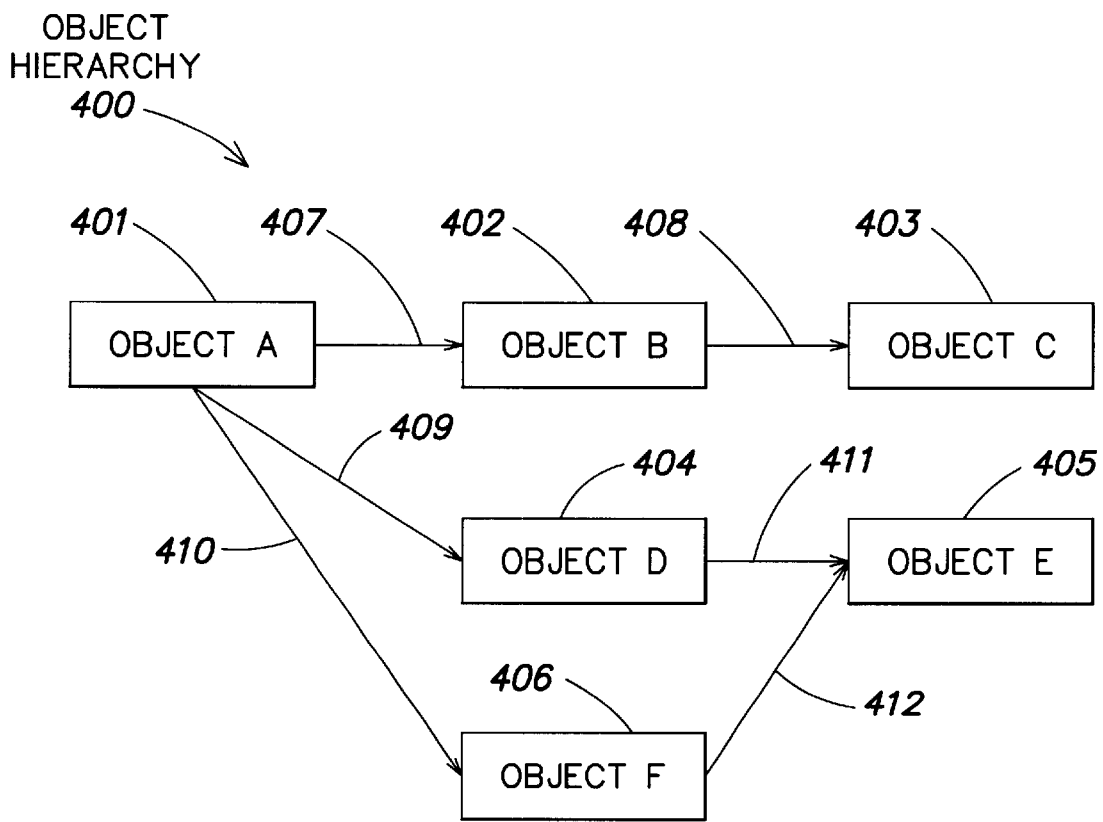
FIG. 4 is a block diagram showing an object hierarchy.

FIG. 4 shows an example of an object hierarchy that may be stored and retrieved by various embodiments of the present invention. Object hierarchy 400 includes a number of objects A–F (items 401–406). Object C 403 inherits data and methods from object B 402 as well as object A 401. Object E 405 inherits data from both object D 404 and object F 406, which in turn both inherit from object A 401. Arrows 407–412 indicate references to objects to remote data. Other types of object hierarchies may be realized.

Figure 5:
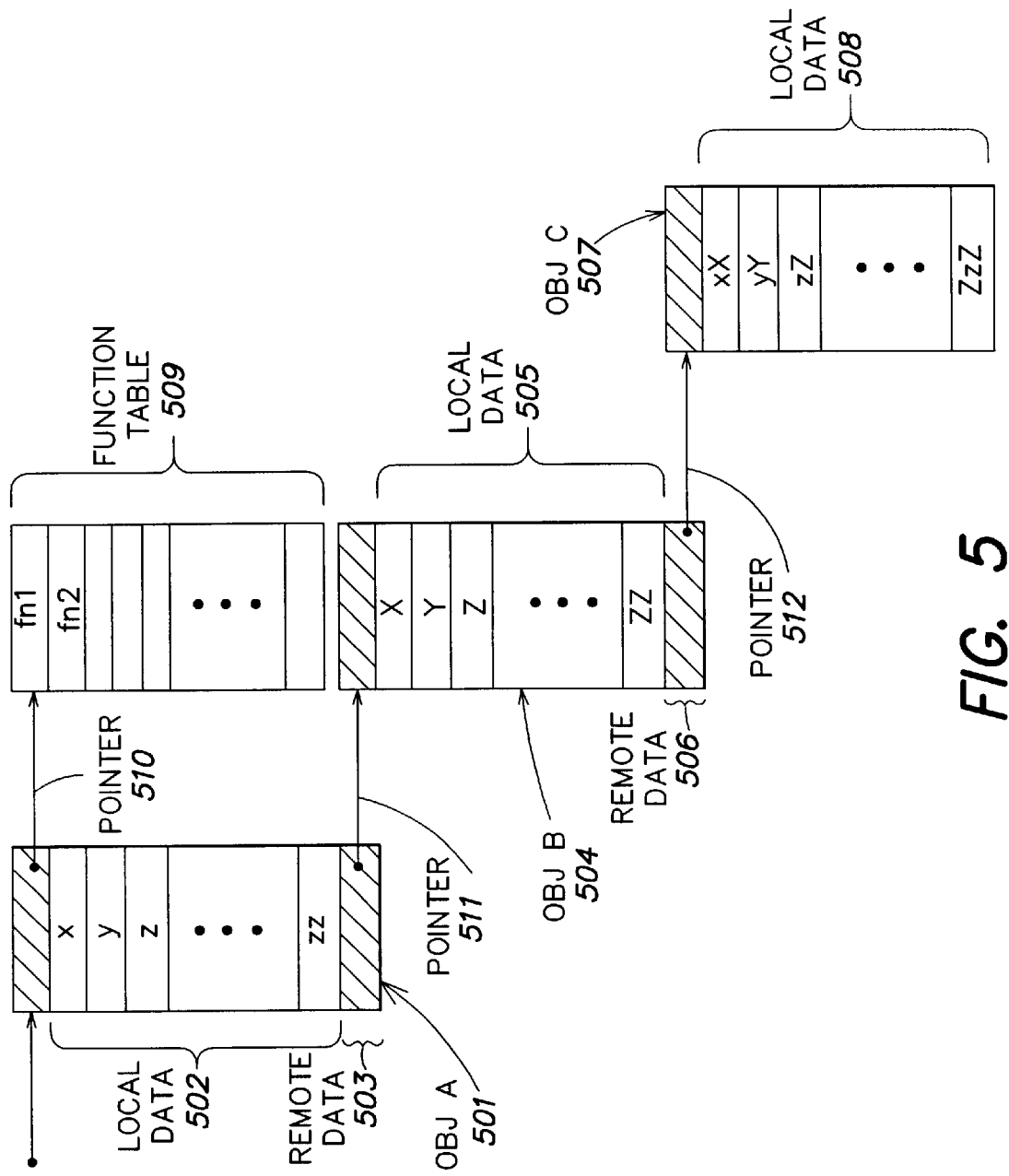
FIG. 5 is a block diagram showing a representation of objects in memory of a computer system.

Looking at objects A–C exclusively, FIG. 5 shows a representation of objects A–C in memory of a computer system. For example, object A 501 may be located at some address within memory 106. Object A 501 may include a pointer 510 to a function table 509 which defines methods for the object. Object A 501 may include local data 502 which may include one or more simple or compound data types. Object A 501 also refers to remote data 503 such as through a pointer 511 to object B 504. Object B 504 may also include local data 505 and remote data 506 such as a pointer 512 to another object such as object C 507, which may in turn have its own local data 508.

Figure 6:
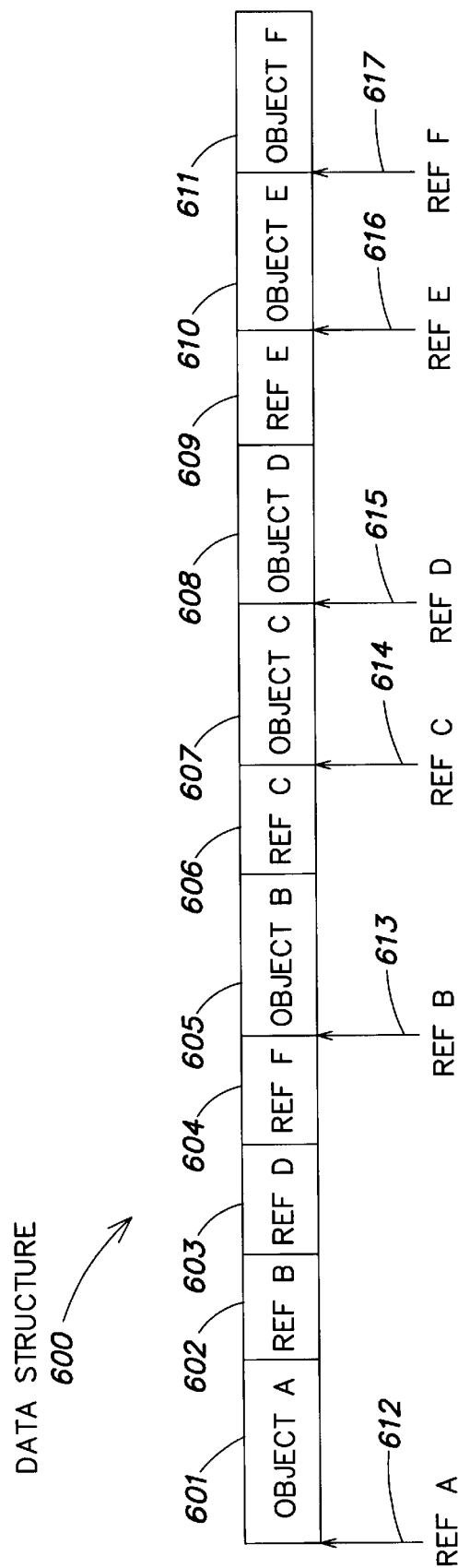
FIG. 6 is a block diagram of a data structure used for storing objects in accordance with one embodiment of the invention.

According to one embodiment of the invention, objects are stored as a stream of data. As shown in FIG. 6, the storage stream may be a concatenation of all the stored objects. The size of the stream is a total of the sizes of the included objects (items 601, 605, 607, 608, 610 and 611) and their references (602, 603, 604, 606 and 609). Each object has a position offset in the stream where the object is located. For example, object A 601, located at the base of the object hierarchy is placed first in the data stream, followed by references to objects B, D, and F (items 602–604, respectively). The references are followed by object B 605 which is then followed by reference to object C 606. The references 612–617 may be, for example, offset addresses from the beginning of the stream that act as locators for the individual objects.

Figure 7:
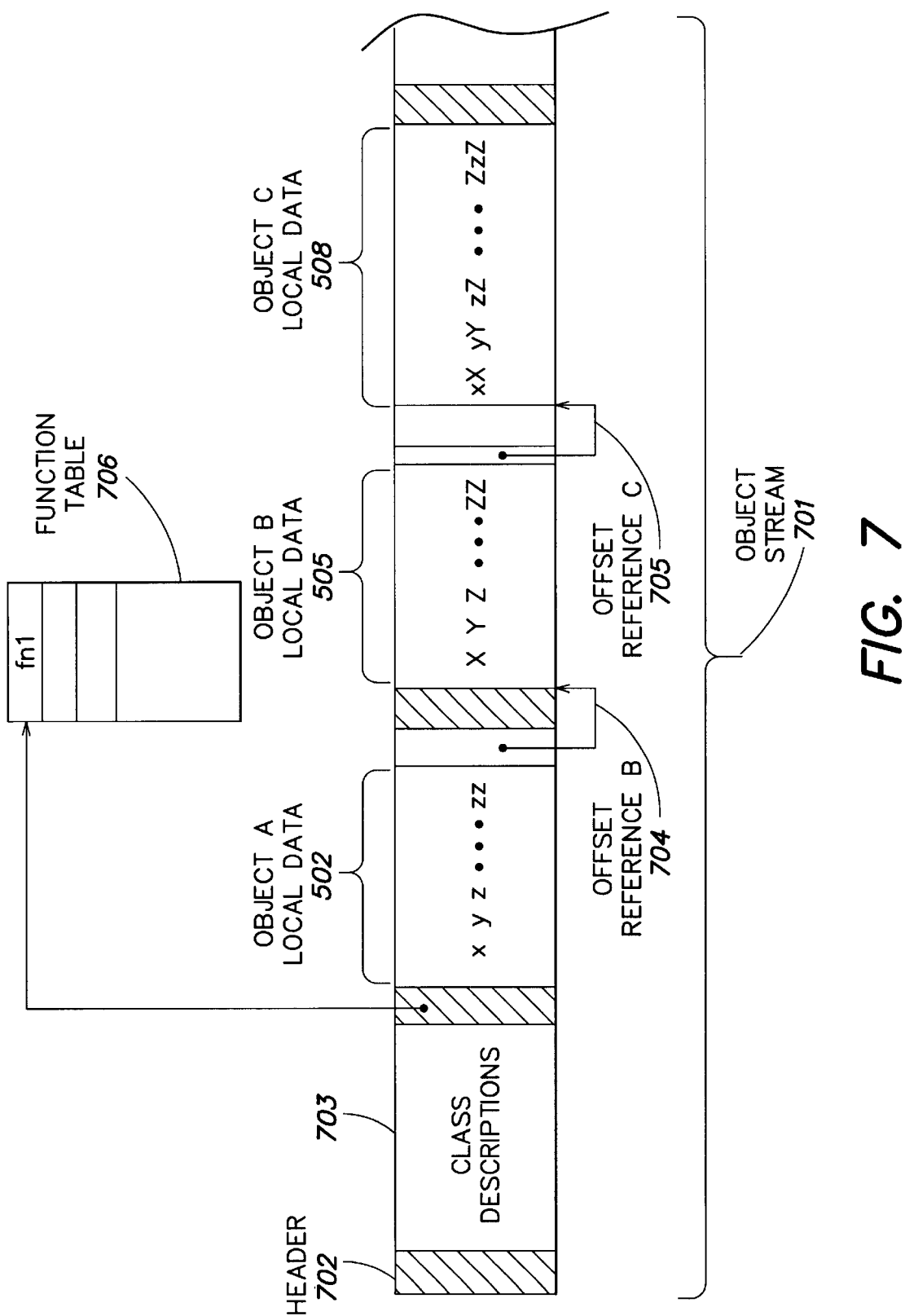
FIG. 7 is a block diagram of an object stream.

FIG. 7 is a block diagram of another embodiment of an object stream 701. The stream 701 may include a header 702 which signifies the beginning of the stream. Header 702 may also include an index of the objects that are stored in the stream and their individual object states. In one embodiment, the header 702 is used to track the deletion of objects within the stream as performed by a delete object operator discussed below with reference to FIG. 12.

Stream 701 may include class description 703 which includes data specified by abstract and concrete object classes. Class description 703 may be followed by a pointer to a function table 706. Stream 701 may also include the objects and their offset references. For example, stream 701 includes object A's local data 502 followed by an offset reference to another object B 704 which points to a location in the stream where object B's local data 505 is located. Local data 505 may be followed by an offset reference to object C 705 which points to object C's local data 508. An object such as object A 601 in FIG. 6 may be followed by one or more references to other objects.

The storage stream may be recovered into volatile memory by loading the entire stream into memory and reconstituting the object references from the offsets stored in the object stream. Because simple data is stored in the same format in the non-volatile medium, there is no need to modify the simple data before restoring it. As a result, only object references need to be resolved when the object stream is recovered into volatile memory.

In general, the local data 502 of object A is actually a number of distinct storage elements (x, y, z . . . zz). In a conventional application of C++, each of the items (x, y, z . . . zz) are individually recovered from a storage stream one at a time. This conventional recovery requires individual calls to read values from the stream and to copy values of the items to internal members of the object reconstituted in memory. Because these calling operations are not required, recovery time is saved. Further, conventional recovery of C++ objects requires that objects are individually allocated and initialized. According to various embodiments, these separate allocation operations are eliminated. The allocation of each object is replaced by a calculation that evaluates the location of the object in the stream.

Figure 8:
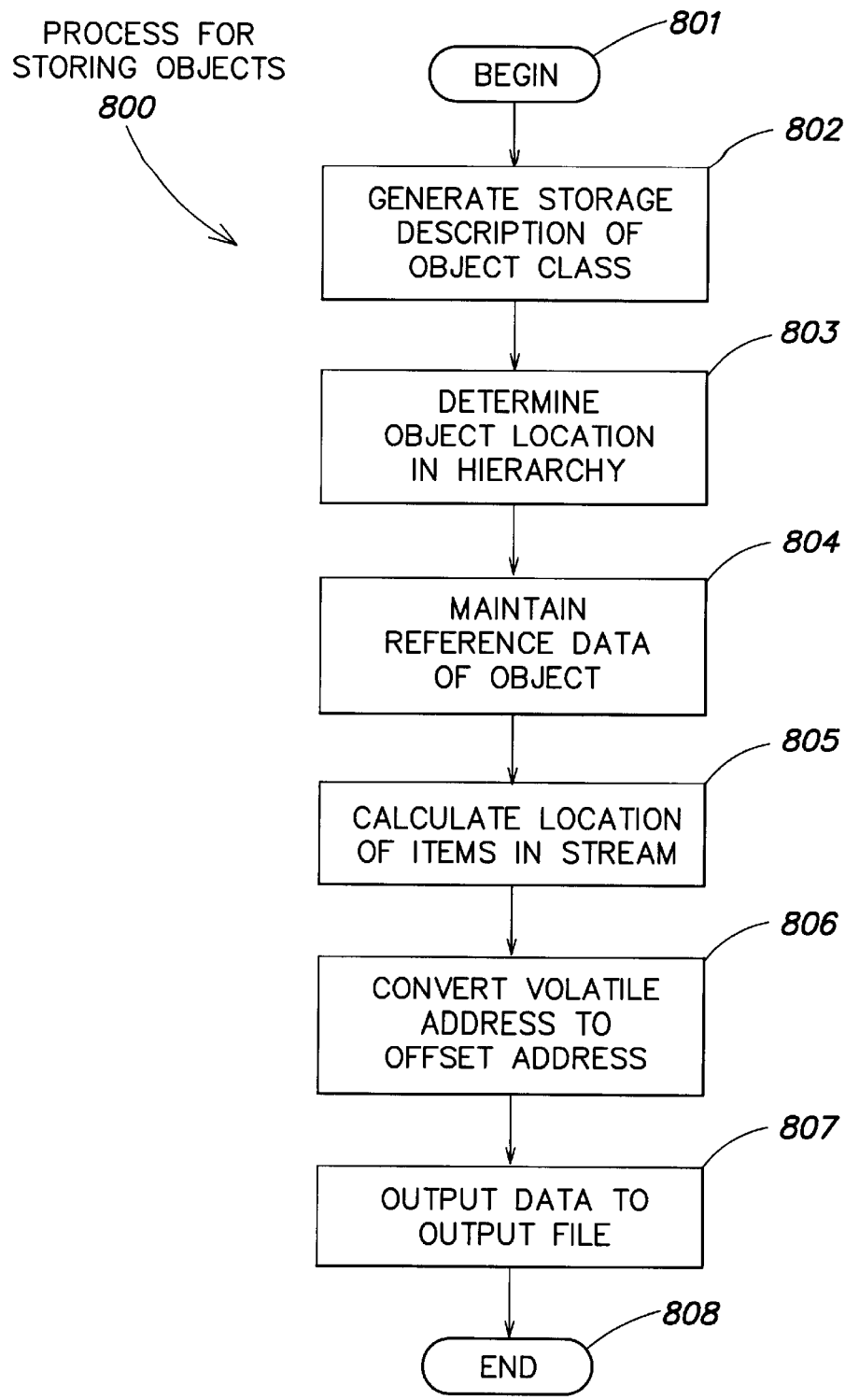
FIG. 8 is a flow chart of a process for storing objects.

FIG. 8 shows a process for storing objects. At step 801, process 800 begins. At step 802, system 201 generates a storage description of the object class. Specifically, system 201 generates a structure whereby the object classes can be restored to memory. Preferably, the object class description allows a recovery of the object function table into memory. At step 803, system 201 determines the object location in the object hierarchy. For example, system 201 determines whether or not the object is the root object or if the object inherits data from another object. At step 804, system 201 maintains reference data for the object. At step 805, system 201 calculates the location of the items in the stream according to their data relationships. System 201 converts the volatile memory address of the objects to offset addresses to be stored in the output stream at block 806. The output stream of data may be output to a file at step 807. At step 808, process 800 ends.

Figure 9:
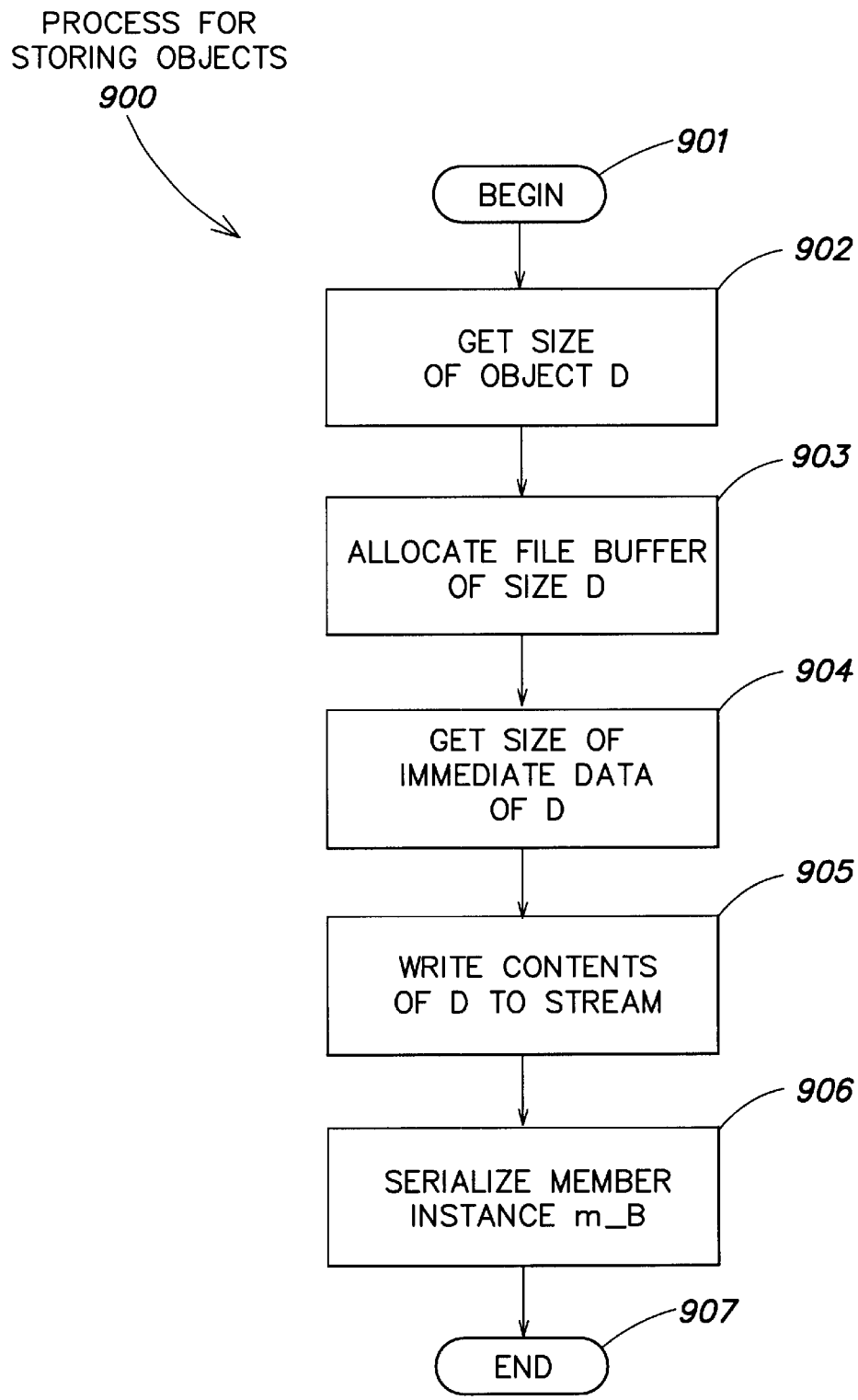
FIG. 9 is a flow chart of a process for recovering objects.

FIG. 9 shows a process for storing objects in accordance with an example of two objects, object D and member instance m_B. At step 901, process 900 begins. System 201, at step 902, obtains the size of object D. The size of object D may be performed by a function which returns the size of object D and all of its referenced data. At step 903, system 201 allocates a file buffer of size of the object D. At step 904, system 201 obtains the size of the immediate data of D, and writes the contents of D's immediate data to the stream at step 905. Because member instance m_B is referenced by object D, member instance m_B is also stored to the stream. At step 907, process 900 ends.

Figure 10:
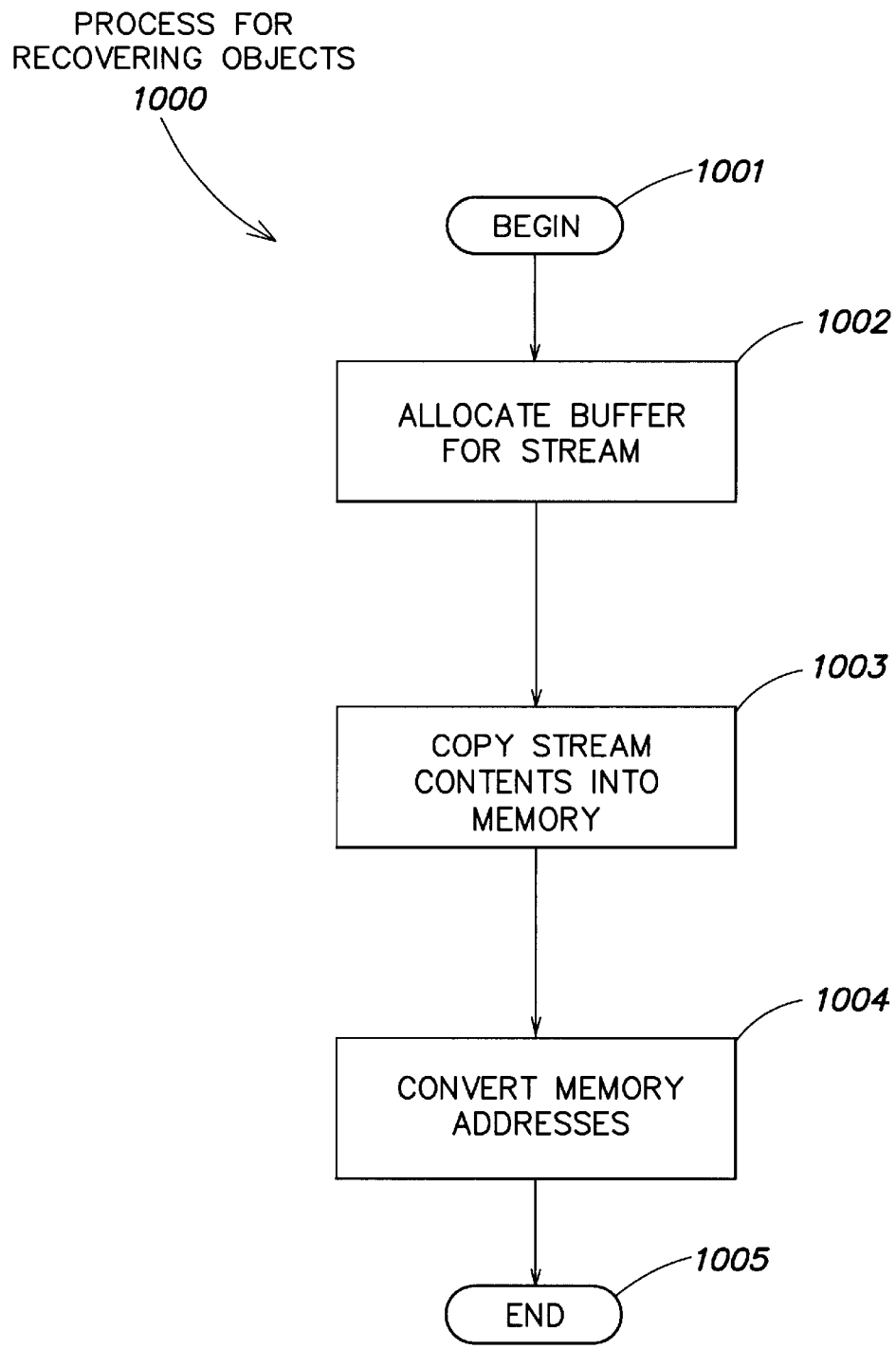
FIG. 10 is a flow chart of another process for recovering objects.

FIG. 10 shows a process 1000 for recovering objects in accordance with one embodiment of the invention. At step 1001, process 1000 begins. At step 1002, system 201 allocates buffer for a data stream. For example, system 201 will allocate a buffer which is the size of the stream. At step 1003, system 201 copies stream contents into memory allocated in step 1002. At step 1004, system 201 converts offset addresses stored in the stream to memory addresses in volatile memory. At step 1005, process 1000 ends.

Figure 11:
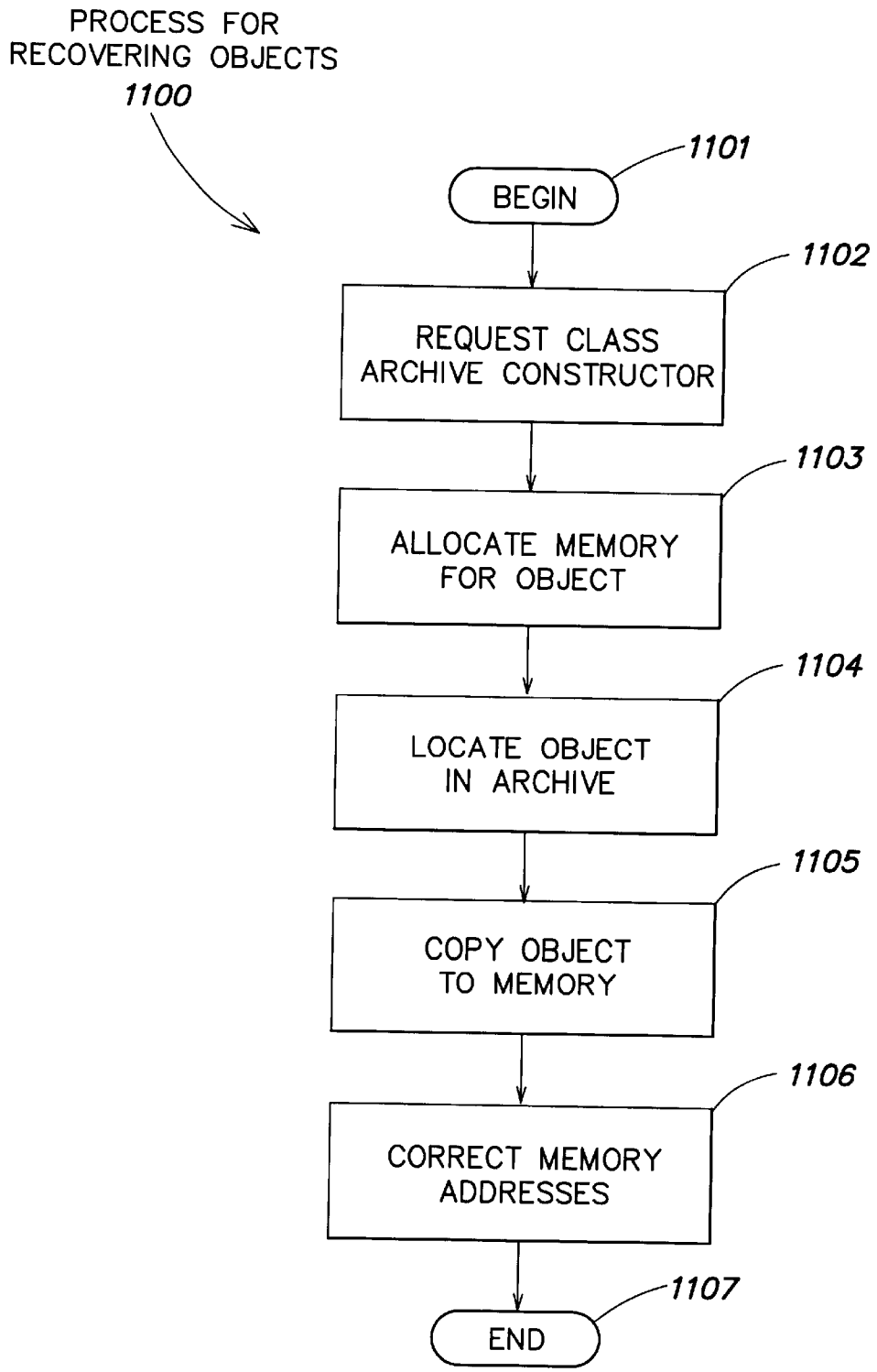
FIG. 11 is a flow chart of another process for recovering objects.

FIG. 11 shows a process 1100 for recovering objects from an archive. At step 1101, process 1100 begins. At step 1102, system 201 requests a class archive constructor. That is, system 201 receives a request from an application to construct an object located in the archive. At step 1103, system 201 allocates memory for the object. At step 1104, system 201 locates the object in the archive. At step 1105, system 201 copies the object to volatile memory. At step 1106, system 201 corrects the offset address to an actual memory address. At step 1107, process 1100 ends.

Figure 12:
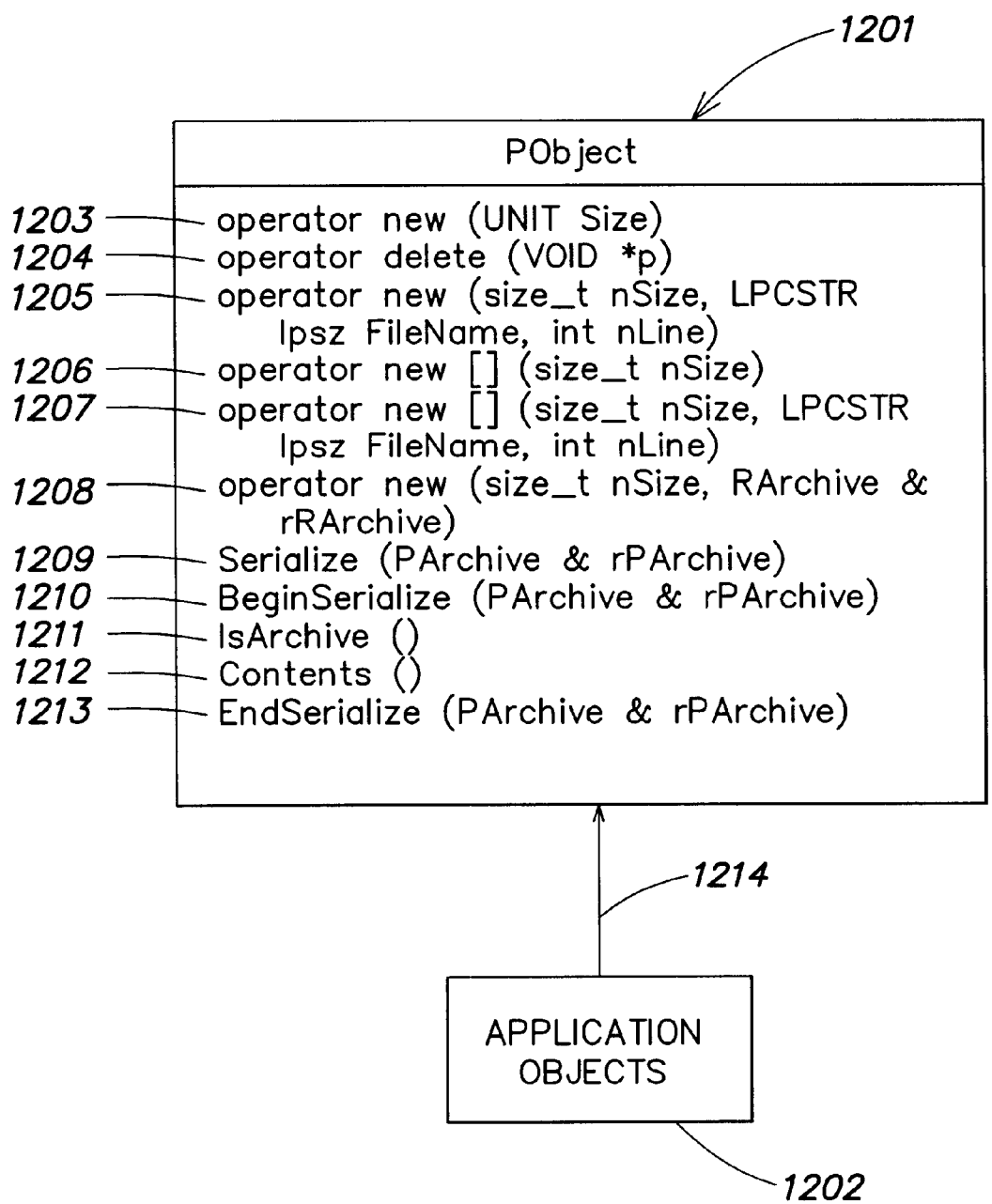
FIG. 12 is an object-oriented diagram of a system for storing and recovering objects.

FIG. 12 shows an object-oriented diagram of a system for storing and recovering objects in accordance with one embodiment of the present invention. The present invention may be implemented as object-oriented software which may be included as part of a programmer's application. For example, system 201 may be implemented as a new object class, such as the PObject class 1201 shown in FIG. 12.

According to one embodiment, the PObject class may be the root object of all persistent objects. That is, the PObject class overrides operator new so that memory management of an object is taken over by PObject. The PObject class may be, for example, an abstract class. In one embodiment, an object that inherits from PObject is either allocated new or is recovered from an archive stream. Arrow 1214 indicates that objects 1202 inherit from PObject 1201. Actual recovery of the object is carried out by the procedure RArchive.

PObject may include a number of operators and methods used to perform object storage and retrieval. For example, PObject 1201 may include the operator new 1203 which accepts a parameter size which is the size of the memory block requested for the object. Operator new 1203 is the standard allocator used for objects which are not in the archive. Also, the standard operator new 1203 may be called during a debug mode for troubleshooting purposes. PObject 1201 may include an operator new 1205 which accepts as parameters the size of the memory block requested, a file name that holds the block of object data, and a line in the file of the requested block of data. Operator new 1205 returns a pointer to the allocated block.

Operator new 1206 also returns a pointer to the allocated block. The purpose for operator new is to intercept all memory requests for the object, and operator new 1206 is in vector support form. Operator new 1207 also intercepts all memory requests for the object when the object is recovered from an archive. This operator new 1207 returns the next block of archive memory. Operator new 1208 accepts as perimeters the size of the memory block requested and the archive used to retrieve the objects into memory.

The purpose of operator delete 1204 is to release memory allocated with operator new. Memory is either owned by the object or it is not. Any memory used by an object loaded from an archive is not owned by the object. However, memory explicitly allocated by the global operator::new is owned by the object. Thus, an operator delete may be used which overrides the default operator delete. The new operator delete 1204 may test to see if the object is part of an archive or not. An indicator in the object may be used to indicate whether or not the object is a member of an archive. If there is no archive, the object is deemed to own the memory so the standard operator delete may be used. Alternatively, if the object is a member of the archive, the state of the object as "deleted" may be indicated in the header 702 of the object stream 701. The purpose of serialize 1209 is to store the object on the persistent archive specified by PArchive. In this example, an object is saved to an in-memory persistent archive PArchive. Objects that are recovered are supported by an in-memory persistent class RArchive. The serial function 1209 may return a result indicating success of the serialization of objects to the archive.

The Begin Serialize function 1210 stores the base block of the object. Persistence, in this example is performed by PArchive. An object calls the Begin Serialize function 1210 at the start of Serialization in the EndSerialize function 1213 when a serialization is complete. The purpose of EndSerialize 1213 is to notify the archive that a serialization of an object is complete. The purpose of Contents 1212 is to return a pointer to the object. Contents 1212 may be called by the archive when an object is serialized. In conjunction with size, the archive is able to persist the base block of the object. The purpose of IsArchive 1211 is to return whether or not an object is stored in a memory archive. For example, the function IsArchive 1211 may return a boolean true when the object is stored in a memory archive.

EXAMPLE CASES

Below are several examples of archival of objects, and differences between conventional archival mechanisms are explained.

Conventional Storage and Retrieval of a C++ object

An object in C++ is usually stored by serializing objects individually to an archive.

If an object class hierarchy consists of the following simple members as follows:

```
Class B
{
   int m_b;
   float m_f;
```
$$B( ) \{ m\_b=0; m\_f=0.0;\} \quad (1)$$
```
};
```

Suppose ar <<m_b means that an archive ar is to save the indicated member m_b.

The object class B is saved by saving the individual members of the object to an archive:

ar<<m_b; // save m_b to an archive ar<<m_f; // save m_f to an archive.

For primitive data types like int and float, the archive supports copying of the contents to the archive. The operation ar <<m_b results in the content of m_b to be copied into the archive ar.

To restore an instance of class B, the following steps are performed:

create an instance of B with the null constructor for the class deserialize the archive into to the object created by the null constructor.

To create an instance of B, in general an allocation function is called (using operator new) and the object is constructed using the NULL constructor:

$$B^* pB=new\ B( ); \quad (2)$$

The operation indicated by statement (2) is actually two operations:

a block of memory with the size of B is allocated from the heap.

The constructor of the default constructor B is actually called with the address given from the allocation function.

In the present example, the allocation itself may be a time consuming call depending on the allocation function used. The default constructor B::B( ) is then called which initializes the members to starting values. The starting values (m_b=0; m_f=0.0;) generally have nothing to do with the values that were saved to the archive but result from the default constructor initialization. As a result of statement (2) above the allocator is called and the default constructor that leads to an object that so far is not the state of the object that was saved to the archive.

Suppose ar>>m_b means that the member m_b is recovered from the archive ar.

The actual recovery of the object follows with the processing outlined below.

To recover the object pB, it is recovered from an archive, for example, archive ar:

ar>>pB;

The object pB is then recovered member by member from the archive:

$$ar>>m\_b; \quad (3)$$
$$ar>>m\_f; \quad (4)$$

The statement ar>>m_b causes the content at the current location in the archive to be copied to the contents of the variable m_b. Many operations are needed to realize an object (pB) in memory with values that were saved at some previous time.

Suppose m_f above is an object of class F rather than a simple float data type. Then the operation ar>>m f performs the following:

1. allocate a block of memory consistent with the size of an object of class F
2. call the default constructor to intialize the object contents for the instance of class F
3. copy the contents of the archive into the object allocated in step 1.

The operation ar>>m__f is equivalent to:

m__f=new F( );

Invoke the following support the recovery of object m__f.

f::operator>>(archive& ar)
{
    recover ar into instance of f
}

In situations where class B is derived from a base class (class A for example), it is necessary to call the default constructor for the class A as well and initialize it with default internal members. The default internal members are then overwritten from the archive in the recovery steps. In a typical application having 1000 objects with a total of 10,000 internal pointer references is considered an average sized problem. This typical application requires thousands of allocation calls and thousands of default initializations to prepare objects to a state to receive useful data. Also, each member is copied into the object instance memory space one element at a time. This copy function is performed for all data whether it be immediate data, object instances, or object references.

High Speed Object Recovery

Referring to the class example used in the previous section, this example shows that fewer steps are performed to recover archived objects than by conventional methods. The method presented has the same net effect as a conventional storage and retrieval of a C++ object, but this method restores the object much faster by eliminating steps. The method uses the entire stream buffer that was originally saved to the non-volatile memory. The stream is saved out in such a manner that each object location is known and the object contents are stored intact. Pointers to the objects are resolved as offsets to contents to the stream buffer which is loaded into memory. The net result is as follows:

(a) the individual allocation of the block for each object that is recovered is effectively eliminated
(b) an archive constructor for the object class is called to recover the object contents from the provided archive
(c) the internal pointers to data references are dereferenced directly
(d) the internal pointers to objects call the relevant archive constructor using operator new
(e) all immediate data requires no processing.

The stream that is actually saved out is viewed as a block of data that is the concatenation of the immediate instance data blocks for the objects in the archive. This stream includes the individual allocated memory blocks for the internal objects that are embedded in compound objects. The objects are concatenated and catalogued in a single stream buffer. Objects in the stream often have references to one another and those are resolved as shared pointers within the stream so that as the objects are recovered, the shared objects references are recalculated to become actual object pointers.

For example, suppose there is an object of class B given by B(10,20.0). The block B is saved to the stream (the entire block is written). In effect, the immediate data of the block B is written to disk in the state that is desired when B is recovered from disk. There are a number of ways of recovering the objects based on how the object serialization is defined. One such implementation follows. Other implementations are possible. An equivalent recovery of an object is as follows:

$$B^* \ pB = new(ar)B(ar); \qquad (5)$$

In statement (5), the operator new(ar) is defined for the object as the allocator for the class B. The operator new(ar) operates on the archive ar. The idea is that the archive delivers the correct pointer to the object B because it was saved out serially in such as way that it is directly available according to the original storage sequence (recall that m__k=10, m__f=20.0 in the stream when it was saved). As a result the block is just an offset in the actual total stream buffer in archive ar in order to reconstitute B. That is a trivial allocation production that has almost no overhead especially as compared to other allocation techniques.

The buffer delivered by new(ar) is saved out to have the correct content of B that was originally saved. That is, the implementation of the archive constructor for B(ar) is as follows:

$$B::B(\text{archive\& } ar) \qquad (6)$$

{
}

It in effect does nothing. The content of B is already m__k=10, m__f=20.0 since it is already resident in the stream with saved memory values. The archive constructor does not initialize any of the immediate data values for the class B as in the default constructor given by 3.9-1. Also note that the statement (6) completely recovers the instance of class B that was desired and that the equivalent operation to 3.9-3 is not required. In the situation that m__f is an object of class F then statement (6) is modified to recover the embedded member m__f as an object of class F that also supports an archive constructor:

B::B(archive& ar)
{
$$m\_f = new(ar)F(ar); \qquad (7)$$
}

Statement (7) requires low overhead in that the operator new (ar) is just an index dereference and the F(ar) is a constructor analogous to statement (6) with the appropriate pointer dereferences as required to account for member pointers and objects internal to class F if any.

For example, suppose that B is derived from D. The archive constructor for B also calls the archive constructor of the base class D:

B::B(archive& ar): D(ar)
{
    m__f=new(ar) F(ar);
}

In general, the constructors of the classes must be called because:

(1) the internal pointers to objects must be recovered
(2) a class with virtual functions must initialize the virtual function table for the class.

The net savings is: (1) a trivial allocation function is called, (2) the default intialization of the class is avoided, (3) the requirement to copy the immediate data from the stream to the object contents is eliminated. One or more of (1)–(3) leads to a significant reduction in execution time.

The discussion above is based on the idea that all objects that are recovered provide an archive constructor. In general, this precludes the serialization of member instances that are embedded inside a class because the compiler generates automatic calls to the null constructor of the class. The following defines an extension for the recovery of the objects that are embedded by the null constructor.

An object may be part of a compound object in one of two ways: either as a instance which is automatically constructed at construction time or as a reference which is explicitly constructed at construction time. The term automatic means the compiler has generated the necessary executable code. The term explicitly constructed means the code author writes the necessary executable code. During construction of a compound object, the comprising object constructors are called whether the compiler has generated the code or the user has generated the code. It is much simpler and more general to instantiate internal objects using the archive constructor for the internal objects.

Extension of the Storage System for the Default Constructor

In the situation where object constructor calls are generated by the compiler to the null constructor, additional information is embedded in the object to eliminate the replacement of the internal data elements in the NULL constructor.

The following limitations are imposed in this example:
 a single object stream may be loaded at a time for any given process
 objects are not constructed during the load that are not explicitly stored in the storage stream.

Given the assumptions above the following straightforward modification is done for the situation when embedded objects are instances and not references. System 201 maintains information accessible to the object constructor class that indicates that a stream load is under way.

If the default constructor appears as follows:

```
f::f( )
{
  m__k=10;
  m__f=20.0;
}
```

The modified default constructor appears as follows:

```
f::f( )
{
if(!loading)
    {
      m__k=10.0;
      m__f=20.0;
    }
}
```

The item "loading" in the code block above is a signal to the default constructor that initialization is not to occur because a load is in progress.

In general, any object system that may be constructed using member object instances may also be constructed using member reference instances. The conversion from the instance to the reference instance form is a direct translation that may be defined in an unambiguous way.

A serial stream may be constructed with the objects saved so that the objects may be recovered.

Support for Serialization of Object Inheritance Hierarchies

Support for inheritance of the object and the support of instance members in a class also may be considered in constructing the archive.

Consider the following example:

```
class A
{
public:
  int m__k;
  float m__f;
  A(int k,float f) { m__k=k; m__f;}
  A( ) { m__k=0; m__f=0.0}
};
```

```
class B
{
public:
  int m__q;
  A m__A;
  B( ) {m__q=0;}
};
class D: public B
  {
public:
  A* m__pA;
  B m__B;
  D( ) {m__pA=new A( )}
};
```

Class A shown above is a simple class consisting of immediate data m__k and m__f. The class B contains a member instance m__A of class A. The class D is derived from B and contains a reference to an object of class A and has immediate data m__B that is an object of class B. Indirectly through class B class D also has a member instance of A (m__A).

A general solution to the archival problem accounts for the classes A, B and D. For class D, the archival solution should account for how D, B, m__B and m__pA objects be placed in a serial stream so that when an instance of D is created from a non volatile storage unit the blocks of base B, member instance m__B and pointer to class A are correctly restored from the stream.

A general class D is derived from some other general class B. The class D may contain zero or more member instances from known classes. The class D also may contain zero or more member references to objects from known classes. The objective is to completely serialize D so that if an instance of D is requested from operator new, the series of buffers that form D and its members are presented in a simple serial sequence.

In C++, constructors for member instances are automatically generated by the compiler, including the derived class, the base class, and the individual members defined in the derived or base classes. In C++ no direct calls to constructors of references to objects is generated.

For class B discussed above, the constructor for member instance m__A is automatically called by the compiler when an instance of B is created.

For class D discussed above, the constructor for base class B is automatically called by the compiler when an instance of D is constructed. Also the constructor for the member instance m__B of class D is called when D is constructed.

For any construction of any instance of class B, the member instance m__A of class B is automatically constructed. The m__pA is a pointer to an object reference is not generated by the compiler in the construction of an object of class D. The user provides the construction of m__pA explicitly by writing support code for any construction of an instance of class D preferably in the constructor of class D. Consider the following statement:

$$D^* pD=new\ D(\ );\qquad(8)$$

A review of the construction order of elements in the construction of an object of type D is given by the following steps (9)–(16):

(9) a block of the size of class D is allocated which includes immediate data of D plus the immediate data of B.

(10) the constructor of D is invoked but the code support of D is not immediately entered

(11) the constructor of B as a base class of D is invoked and if B is primitive (B is not derived from any other class) then the member instances of B are initialized.
(12) the member instance m_A of class B is constructed with the default constructor for class A by the constructor code for class B
(13) the member m_B of class D is constructed using the default constructor for class B
(14) the initialization code in the constructor of D is executed (m_pA=new A( );)
(15) the object reference pD is assigned the value of the allocation from step 4.4-1 and the object referenced by pD is totally initialized.

Notice in the steps (9)–(15) above that m_pA=new A is the only object that is not automatically constructed by the compiler. It is a reference to an object that is constructed by the author of the code. In short, C++ does no automatic constructions for object references.

Statement (8) involves an allocation as a result of the request to operator new. The only other allocation involved in steps (9)–(15) is the allocation in step (f) (m_pA=new A( ). The original memory allocated in (8) is the memory used to initialize the member instances involved in steps (9)–(15).

In principle there are two blocks of data that are saved when saving the object manufactured by statement (8): (1) the block associated with the allocation of object D and (2) the block associated with the allocation of m_mpA. The size of the allocation of object D is the concatenation of the sizes of all of the objects comprising D: the immediate data of D, the immediate data of B as a base class of D, the size of class A as a member instance of B, the size of m_B as a member of D. Obviously the sizes of the atomic member instances (int, float, m_pA storage) is also part of the sizing of the block associated with the allocation in the request statement (8).

Because there are only two blocks involved in the object D, it is sufficient to store two concatenated blocks to save the object pD manufactured in statement (8); the first block is the allocation of the object D and the second is the allocation of the member m_pA of object D. If those two blocks are saved and restored and the object constructors behave correctly, then the entire object D may be reconstituted in memory from the saved blocks.

System 201 defines the set of operations and rules by which blocks of data are saved and the order in which the blocks are saved so that retrieved blocks are in a serial order which are compliant with a standard construction sequence generated by a C++ compiler. An objective of system 201 is to de-compile the execution order that is manufactured by the compiler in generating the execution order of constructors. The buffers internally allocated by any object in the hierarchy in the exact sequence as expected is provided to restore the volatile memory in a manner to reconstitute the object. The entire object hierarchy is restored in an operation which is less computationally intensive than the execution pass of the default constructor of the object. Only single pass of the archive constructor is to completely restore the object.

Serialization rules for an object may be now be defined: a block that is allocated is serialized to the stream. The serialization of objects is performed in the order in which the reconstruction of the object that it is associated with is recovered.

An object may be part of a C++ object hierarchy in one of the following ways as defined in (a–d)
(a) it is a primitive base class (it is not derived from any other objects)
(b) it is a object that is derived from a base class
(c) it is an instance of one class that is a member of a class
(d) it is a reference to an object that is a member of a class.

Referring to the discussion above, the following are examples of the definitions just given in (a)–(d):
class A is a primitive base class
class B is derived from a base class
m_A is an instance of class A that is a member of class B
m_pA is a reference to an object that is a member of class D.

To serialize an object in general form for fast recovery the following steps (17)–(20) are taken
(17) the object total immediate data is saved (the total immediate data is the totality of the size of the entire class, including base classes and all member instances)
(18) if the object is not primitive the base class is requested to serialize all internal object references
(19) the object requests that all members serialize all internal object references. The member instances are requested to perform the serialization operation in the order in which they are declared in the class.
(20) all the internal object references are serialized by the object. Serializing an object reference implies Step (17) is in effect for that object.

By following the rules of Steps (17)–(20) above, the object has serialized all the allocated blocks in the order in which the blocks are requested to be reconstituted. The construction of the object D requests the object to be constructed in an order that is consistent with the production defined by Steps (9)–(12).

The archive stack manager 310 is responsible for production of the serial stream. The archive stack manager 310 requests from the objects that the object perform the necessary serialization operations that the archive then formats into the reloaded volatile memory image. On recovery of the object, the archive stack manager 310 generates the necessary memory blocks to produce the correct production of internal blocks to meet the requirements of the objects under construction.

Archive Example

Consider the following example:
ar<<m_a is an indication that object m_a is to be saved to the archive ar
operator<<(ar,a) is the support for the serialization of an object a to an archive ar when the object is an instance of the class
operator<<(ar,a*) is the support for the serialization of an object reference *a to an archive a
a::size( ) is the support given by object a to determine the size of object a that includes the size of all derived and immediate data.
a* a::contents( ) is the support given by object a to access the data location of that includes the size of all derived and immediate data for object a.

All objects support size( ) and contents( ) in the same manner. Size returns the size of the immediate data. The contents( ) returns the reference to the immediate data. The inverse compilation applied to class A, B, D described above is outlined.

The support for serialization of the objects is as shown in the following pseudo code:
operator<<(ar,A) (A1)
{
    ar.start( ); // indicate to the archiver that a serialization is started (A2)

```
ar.end( ); // indicate to the archiver that a serialization is
    completed (A3)
}
operator<<(ar,A*)
{
    ar.start( ); // indicate to the archiver that a serialization is
        started (A4)
    ar.end( ); // indicate to the archiver that a serialization is
        completed (A5)
}
operator<<(ar,B)
{
    ar.start( ); // indicate to the archiver that a serialization is
        started (B5)
    ar<<m__a: // B
}
operator<<(ar,D) (D1)
{
    ar.start( ); // indicate to the archiver that a serialization is
        started (D2)
    B::<<(ar); // call the base support of the base class (D3)
    ar<<m__B; // call the instance support of the embedded
        instance m__B (D4)
    ar<<m__pA; // call the reference support of the member
        reference m__pA (D5)
    ar.end( ); // indicate to the archiver that a serialization is
        completed (D6)
}
```

(A1)–(D6) above are identifiers of executable statements.

The archiver state is an in memory image of the stream given by S. The following is a description of the processing when an object of class D is saved to the archive.

The following describes operations at the indicated execution statements. The pseudo code statements are noted to the right.

The archiver is responsible for the following on the serialization of d (an instance of the class D) which is initiated by ar<<d:
(Start the serialization of the object d of Class D)
ar.start( ): (D2)
    invoke s=d.size( ) to obtain the size of the class d
        invoke c=d.contents( ) to obtain the contents of the
            immediate data of the class
        write the contents c of size s to the stream S.
(call the serialization of the base class B of class D)
B::<<(ar): (D3)
    ar.start ( ) is ignored since B is embedded in D(B2)
        ar<<m__A; (B3)
            ar.start( ) is ignored since A is embedded in B (A2)
            ar.end( ) is ignored since A is embedded in B (A3)
    ar.end( ) is ignored since B is embedded in D (B4)
(call the serialization of the member instance m__B of class B)
ar<<m__B; (D4)
    ar.start ( ) is ignored since B is embedded in D (B2)
        ar<<m__A; (B3)
            ar.start( ) is ignored since A is embedded in B (A2)
            ar.end( ) is ignored since A is embedded in B (A3)
ar.end( ) is ignored since B is embedded in D (B4)
(call the serialization of the member reference of m__pA)
ar<<m__pA;
    ar.start( ) is called to start a new object on the stream S
        (A4)
    ar.end( ) is called to end the new object on the stream S
        (A5)

The archive appends m__pA to the archive stack ar.end ( )

The archive appends the object D to archive stack.

The archive stack consisting of D and m__pA are written to the physical storage stream S since the ar.end( ) indicates that no remaining objects are present on the archive stack. The archive stack is written and the stream S is saved as the non volatile representation of the original object of class D.

The two blocks of data are written to the stream S in the sequence above. The first is the primitive block associated with the original object D. The second is the primivitive block associated with m__pA. The object D is written to the stream S in such a way that the location of m__pA contains an offset to the actual location of the object for m__pA. In the non volatile storage there are no actual references, there are offsets from the start of the buffer containing the non-volatile storage. Many of the ar.start( ) and ar.end( ) statements are ignored above. The reason they are ignored is that an embedded object is not written out if it either part of the base of the derived object or if the embedded object is a member instance of the class. The size of(class D) contains all of the storage for the entire primitive block of D that includes the base class B and the member instance of class m__B. As a result for example the statement D4 has no net effect on the archive stack since the size of(class B) is included in the size of(class D).

Once the stream S is obtained it may be loaded as a source of an object of class D that is equivalent in the original volatile state. The word "equivalent" is used because the actual object locations are not in an absolute way at the original locations of the original object of class D in volatile memory. Off course in a relative way the object restored from the stream and the original object respond in an identical fashion with respect to functional response. A difference between the original volatile object and the restored object from non volatile memory are the value of the object references.

Recovering an Object from the Volatile State

A stream S containing objects may be loaded to produce objects in the volatile state. An internal memory buffer that size of the entire stream S is allocated and the contents copied to the memory buffer. In some operating systems the memory is directly mapped to the buffers of the file and paged as necessary to obtain the objects. Each object is recovered by converting the offset of the object to a memory address that is in the scope of the buffer defined by the file buffer mapping. The conversion of the address is performed by the archive. The archive utilizes built-in C++ support for "operator new" overrides that allows the code author to provide a localized allocator. The localized allocator is the object dereferencing mechanism just mentioned. An object is recovered from the archive by invoking "operator new" that the object supports.

Consider an object class D that is derived from object class B.

For an object of a class D support for the archive is achieved by adding an operator new:
VOID* B::operator new(int size,archive& ar)
{
    return ar->AdvanceObject( );
}

The object B supports an archive constructor that is associating the object from reconstituting an archive.
B::B(archive& ar)
{ recover B members}

Note that the class B provides the operator new support that is available to D via inheritance.

The class D supports an archive constructor that requests the base class archive constructor:

D::D(archive& ar): B(archive& ar)
{ recover member instances }

The archive accepts a request that an object be returned from the stream that is internal to the archive. The archive returns the reconstituted address of the object in the volatile memory of the mapped file buffers. There are two operations that the object class provides:

(a) the operator new that uses the archive as a memory source
(b) an archive constructor that recovers the member references that are contained in the object.

The member references that are recovered involve the inverse operations that are associated with serializing the member references in the storage phase.

Example of Recovery of Objects

This is a description of the archive constructors for the objects defined in statement (8).
Suppose operator>>(ar,A) is the recovery operator for class A.
Suppose operator>>(ar,B) is the recovery operator for class B.
Suppose operator>>(ar,D) is the recovery operator for class D.

In general an object X has operator>>(ar,X) defined as:
operator>>(ar,X) (X1)
{
    return new(ar) X(ar); (X2) // return a new object of class X from archive ar
}

Notice that the recovery operator calls the new support that is provided by the object X or from some base class in the inheritance hierarchy of X. The object class X provides an archive constructor of the form:

X::X(archive& ar): B(ar)
{
    recover the members of X
}
where B is a class from which X is derived.

For the example described above, these archive constructors may be written:
considerations in constructing the archive.
A::A(archive& ar)
{
    // since A had no object references, there is nothing to do
}
B::B(archive& ar)
{
    // since B had no object references, there is nothing to do
}
D::D(archive& ar):B(ar)
{
    ar>>m_pA; // recover the object reference to A
}

Notice that the recovery constructors are substantially simpler than the original object default constructors. Notice also that the default constructors are not called unless called directly by the compiler in reconstructing an instance as a member of the class. Notice that the only productions that lead to a block of data from the archive are the productions anologous to those that led to the production of a block to the archive in the first place. Of course the immediate data of those two blocks are one and the same.

Destruction of Objects

Objects that are allocated using the fast recovery scheme are resident in the same block of memory. The address of each object is distinct, but collectively forms the block either from the original single allocation or from the file buffer mapping. In general, the destruction of an object in C++ is achieved by calling the destructor of the object followed by the deallocation of the memory associated with the object.

Consider the simple object sequence of objects, a and b that are saved to archive ar.
ar<<a; // save object a
ar<<b; // save object b.
Now the objects may be reconstituted as:
ar>>x; // recover object a into object x
ar>>y; // recover object b into object y
The operations:
delete x; or
delete y
are invalid. The reason is that the objects x and y that are obtained from the stream for ar are both embedded within the same memory block.

A delete operator should be used to support the destruction of the archived objects.

An example of operator delete for a base class B follows:
VOID B::delete( )
{
    if B is an archive object
    notify archive that B is released
    else
    use standard compiler operator delete
}

The pseudo code for operator delete above requires that the object be aware of the archive from which it was derived. In one embodiment, a base object is defined from which the archive objects are derived. The base object maintains the knowledge of the archive where the objects are actually resident. If the archive is not an archive object, the usual deallocator is used.

While various embodiments of the present invention have been described above, it should be understood that they have been presented by way of example only, and not limitation. Thus, the breadth and scope of the present invention are not limited by any of the above exemplary embodiments, but are defined only in accordance with the following claims and their equivalents.

What is claimed is:

1. A method for storing an object hierarchy having a plurality of objects, the method comprising steps of:
    a) storing, in a data stream located in a volatile memory, the data stream having a format, data of a first object having a reference to a second object;
    b) storing, in the data stream, the reference to the second object in the data stream;
    c) storing, in the data stream, data of the second object; and
    d) storing each of the plurality of objects of the object hierarchy in a single data stream, the data stream being stored in a non-volatile memory in a format structurally equivalent to the format of the data stream located in the volatile memory.

2. The method of claim 1, wherein step b) includes a step of storing an offset address that indicates a location of the second object in the data stream.

3. The method according to claim 2, further comprising a step of determining the offset address from a volatile address of the second object.

4. The method according to claim 2, further comprising a step of determining offset addresses for each of the plurality of objects stored in the data stream.

5. The method of claim 1, wherein the data stream is a file.

6. The method of claim 1, wherein the data stream is a location in computer memory.

7. The method of claim 1, wherein the data stream is transmitted over a communications network.

8. The method according to claim 1, further comprising a step of allocating a block of storage space for two or more of the plurality of objects.

9. The method according to claim 1, wherein the first and second objects are stored in the data stream substantially the same format as the first and second objects appear in computer memory.

10. The method according to claim 9, wherein step b) includes a step of storing an offset address that indicates the location of the second object in the data stream.

11. The method according to claim 9, further comprising a step of determining offset addresses for each of the plurality of objects stored in the data stream.

12. The method according to claim 9, further comprising a step of replacing an actual address reference to the second object by an offset address to the second object.

13. The method according to claim 12, wherein the offset address is an offset from the beginning of the stream.

14. The method according to claim 1, and in an object-oriented system, the first object inherits data from the second object.

15. The method according to claim 1, further comprising a step of storing object class definitions in the stream.

16. The method according to claim 1, wherein in steps a), b), and c), data is stored in a serial format.

17. A data structure for storing instantiated objects of an object-oriented programming language produced by the method of claim 1, the data structure comprising:
   immediate data of a first object;
   immediate data of a second object; and
   an offset reference from the first object to the second.

18. The data structure according to claim 17, further comprising a reference to a function table holding functions for the first object.

19. The data structure according to claim 17, further comprising a header indicating a state of the first and second objects.

20. The data structure according to claim 17, further comprising class description information.

21. The data structure according to claim 17, further comprising a third object and an offset reference to the third object.

22. The method of claim 1, further comprising:
   storing, in the data stream, all data referenced by the first object.

23. A method for recovering an object hierarchy having a plurality of stored objects from storage media into computer memory, the method comprising:
   allocating memory for the plurality of stored objects;
   copying each of the plurality of stored objects of the object hierarchy from storage media into computer memory, wherein the format of the stored objects in computer memory is structurally equivalent to the format of the stored objects on the storage media; and
   converting addresses of the stored objects to actual addresses in computer memory.

24. The method according to claim 23, wherein step a) includes collectively allocating memory for the plurality of objects.

25. The method according to claim 23, further comprising a step of adding, to each of the addresses of the stored objects, a value that represents a location of a beginning of an allocated data area in computer memory.

26. The method according to claim 23, further comprising a step of allocating a data area in computer memory for the plurality of stored objects.

27. The method according to claim 26, wherein a size of the data area allocated depends upon the size of the stored objects.

28. The method according to claim 23, wherein the copying step includes copying a stream of data representing the objects into computer memory.

29. A computer program product comprising a computer readable medium having computer program logic recorded thereon for enabling a processor in a computer system to store an object hierarchy having a plurality of objects, the computer program being adapted to cause the computer system to perform the steps of:
   a) storing, in a data stream located in a volatile memory, the data stream having a format, data of a first object having a reference to a second object;
   b) storing, in the data stream, the reference to the second object in the data stream;
   c) storing, in the data stream, data of the second object; and
   d) storing each of the plurality of objects of the object hierarchy in a single data stream, the single data stream being stored in a non-volatile memory in a format structurally equivalent to the format of the data stream located in the volatile memory.

30. The computer program product according to of claim 29, wherein step b) includes a step of storing an offset address that indicates a location of the second object in the data stream.

31. The computer program product according to claim 30, wherein the computer further performs a step of determining the offset address from a volatile address of the second object.

32. The computer program product according to claim 30, wherein the computer further performs a step of determining offset addresses for each of the plurality of objects stored in the data stream.

33. The computer program product of claim 29, wherein the data stream is a file.

34. The computer program product of claim 29, wherein the data stream is a location in computer memory.

35. The computer program product of claim 29, wherein the data stream is transmitted over a communications network.

36. The computer program product according to claim 29, wherein the computer further performs a step of allocating a block of storage space for two or more of the plurality of objects.

37. The computer program product according to claim 29, wherein the first and second objects are stored in the data stream substantially the same format as the first and second objects appear in computer memory.

38. The computer program product according to claim 37, wherein step b) includes a step of storing an offset address that indicates the location of the second object in the data stream.

39. The computer program product according to claim 37, wherein the computer further performs a step of determining offset addresses for each of the plurality of objects stored in the data stream.

40. The computer program product according to claim 37, wherein the computer further performs a step of replacing an actual address reference to the second object by an offset address to the second object.

41. The computer program product according to claim 40, wherein the offset address is an offset from the beginning of the stream.

42. The program product according to claim 29, and in an object-oriented system, the first object inherits data from the second object.

43. The computer program product according to claim 29, wherein the computer further performs a step of storing object class definitions in the stream.

44. The computer program product according to claim 29, wherein in steps a), b), and c), data is stored in a serial format.

45. The computer program product according to claim 28, wherein the data stream contains all data referenced by the first object.

* * * * *